US011932336B1

(12) United States Patent
Shingu et al.

(10) Patent No.: US 11,932,336 B1
(45) Date of Patent: Mar. 19, 2024

(54) RAIL AND ROLLER FIT AND FINISH ADJUSTMENT

(71) Applicant: Honda Motor Co., Ltd., Tokyo (JP)

(72) Inventors: Hiroshi Shingu, Walled Lake, MI (US); Joji Goto, Tochigi (JP); Takashi Fukahori, Tochigi (JP); Yuichiro Saiki, Sakura (JP); Masatoshi Adachi, Tochigi (JP); Christopher T. Laue, Delaware, OH (US); Khang C. Nguyen, Columbus, OH (US); Kenichiro Kagawa, Tochigi (JP); Makoto Ono, Tochigi (JP); Sunao Tachiki, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/086,794

(22) Filed: Dec. 22, 2022

(51) Int. Cl.
*B62D 65/02* (2006.01)
*B62D 65/06* (2006.01)
*B60J 5/06* (2006.01)

(52) U.S. Cl.
CPC ......... *B62D 65/026* (2013.01); *B62D 65/022* (2013.01); *B62D 65/028* (2013.01); *B62D 65/06* (2013.01); *B23P 2700/50* (2013.01); *B60J 5/06* (2013.01)

(58) Field of Classification Search
CPC ............ B60J 5/06–062; Y10T 29/4978; Y10T 29/49895; B62D 65/06; B62D 65/026; B62D 65/028; B62D 65/022; B23P 2700/50
See application file for complete search history.

(56) References Cited

U.S. PATENT DOCUMENTS

| | | | |
|---|---|---|---|
| 7,669,367 | B2 | 3/2010 | Shimura et al. |
| 9,061,570 | B1 | 6/2015 | Je et al. |
| 9,399,388 | B2 | 7/2016 | Yasunaga et al. |
| 9,637,968 | B2 | 5/2017 | Guitar et al. |
| 9,896,871 | B2 | 2/2018 | Ungetheim et al. |
| 10,914,108 | B2 | 2/2021 | Yun et al. |
| 2018/0099546 | A1* | 4/2018 | Anderson .............. B60J 5/0468 |

FOREIGN PATENT DOCUMENTS

| | | |
|---|---|---|
| CN | 203701861 U | 7/2014 |
| CN | 204126437 U | 1/2015 |
| GB | 738054 | 10/1955 |
| JP | 4978446 | 7/2012 |

* cited by examiner

*Primary Examiner* — Matthew P Travers
(74) *Attorney, Agent, or Firm* — Mark E. Duell; RANKIN, HILL & CLARK LLP (57) ABSTRACT

A method of properly aligning a sliding side door on a vehicle includes first preparing a prototype vehicle and determining how far out of alignment the door is to the body of the prototype vehicle. This amount of misalignment is then used to adjust the attachment position of an anchor plate to a sliding side door of the vehicle, so that the anchor plate is attached at a desired position to the production vehicle, which causes there to be no misalignment between the sliding side door and the body of the production vehicle. A jig is used to hold the anchor plate at the desired location while welding the anchor plate to the door. A roller assembly is then attached to the anchor plate and to a rail on a body of the vehicle.

15 Claims, 8 Drawing Sheets

RAIL AND ROLLER FIT AND FINISH ADJUSTMENT

BACKGROUND

A vehicle sliding side door is mounted to a body of a vehicle, and moves between a closed configuration in which the door covers an opening in the vehicle body, and an open configuration in which the door does not cover the opening.

The sliding side door is to be aligned with the opening in the body of the vehicle so as to close properly, prevent leaks, improve aesthetics, etc. After the door is attached to the vehicle during production, the alignment of the door with the vehicle is observed. Customized adjustments to the alignment of the door are manually made on an individual-vehicle basis according to how far out of alignment the door is with the body of the vehicle. Such adjustments are not standardized, but are customized based on the alignment of the already-attached door, and thus are not conducive to the mass production of vehicles.

BRIEF DESCRIPTION

According to one aspect, a method of connecting a sliding side door on a body of a vehicle includes a) providing a roller assembly, an anchor plate for the roller assembly, and a jig; b) using the jig to secure the door and the anchor plate; c) adjusting a position of the anchor plate with respect to the door so that, when the door is mounted to the body of the vehicle and is in a closed configuration, the door is in a desired alignment with respect to the body of the vehicle; d) while the jig is securing the anchor plate and the door and after adjusting the position of the anchor plate with respect to the door, connecting the anchor plate to the door; e) connecting the roller assembly to the anchor plate; and f) connecting the door to the body of the vehicle by connecting the roller assembly to a rail on the body of the vehicle.

The method may further include the following steps performed before steps a) to f): g) preparing a prototype vehicle including a prototype sliding side door connected to a prototype body of the prototype vehicle via a prototype anchor plate, a prototype roller assembly, and prototype rail; h) ascertaining an alignment of the prototype door with respect to the prototype body of the prototype vehicle when the prototype door is in a closed configuration; i) comparing the alignment of the prototype door with respect to the prototype body of the prototype vehicle to the desired alignment of the door with respect to the body of the vehicle; and j) determining a desired position of the anchor plate with respect to the door that will allow the door to be in the desired alignment with respect to the body of the vehicle when the door is mounted to the body of the vehicle and is in a closed configuration. The position of the anchor plate with respect to the door is adjusted in step c) so that the anchor plate is in the desired position with respect to the door.

According to another aspect, a method of producing a plurality of vehicles, includes determining a desire position for an anchor plate including by a) preparing a prototype vehicle including a prototype body, a prototype sliding side door connected to the prototype body via a prototype anchor plate attached at a target position to the prototype door, a prototype rail attached to the prototype body, and a prototype roller assembly connected to the prototype anchor plate and the prototype rail; b) ascertaining an alignment of the prototype door with respect to the prototype body when the prototype door is in a closed configuration; and c) comparing the alignment of the prototype door with respect to the prototype body to a desired alignment of the prototype door with respect to the prototype body to arrive at a difference between the alignment of the prototype door with respect to the prototype body and the desired alignment of the prototype door with respect to the prototype body. The difference between the alignment of the prototype door with respect to the prototype body and the desired alignment of the prototype door with respect to the prototype body is an adjustment to the target position. The desired position is the target position combined with the adjustment to the target position. The method includes producing the plurality of vehicles including by d) providing a roller assembly, an anchor plate for the roller assembly, and a jig; e) using the jig to secure a sliding side door and the anchor plate; f) adjusting a position of the anchor plate with respect to the door so that the anchor plate is in the desired position such that when the door is mounted to a body of the vehicle and is in a closed configuration, the door is in a desired alignment with respect to the body of the vehicle; g) while the jig is securing the anchor plate and the door and after adjusting the position of the anchor plate so the anchor plate is in the desired position, connecting the anchor plate to the door; h) connecting the roller assembly to the anchor plate; and i) connecting the door to the body of the vehicle by connecting the roller assembly to a rail on the body of the vehicle.

According to another aspect, a system for connecting a sliding side door to a body of a vehicle includes an upper anchor plate configured to attach to the sliding side door at a desired upper position on the sliding side door; an upper roller assembly configured to attach to the sliding side door via the upper anchor plate; a center anchor plate configured to attach to the sliding side door at a desired center position on the sliding side door; a center roller assembly configured to attach to the sliding side door via the center anchor late; a lower anchor plate configured to attach to the sliding side door at a desired lower position on the sliding side door; and a lower roller assembly configured to attach to the sliding side door via the lower anchor plate. Attaching the upper anchor plate to the sliding side door at the desired upper position, attaching the center anchor plate to the sliding side door at the desired center position, and attaching the lower anchor plate to the sliding side door at the lower position will result in the sliding side door being properly aligned with the body of the vehicle.

According to another aspect, method of determining a desired position for an anchor plate on a sliding side door of a vehicle includes a) preparing a prototype vehicle including a prototype body, a prototype sliding side door connected to the prototype body via a prototype anchor plate attached at a target position to the prototype door, prototype rail attached to the prototype body, and a prototype roller assembly connected to the prototype anchor plate and the prototype rail; b) ascertaining an alignment of the prototype door with respect to the prototype body when the prototype door is in a closed configuration; and c) comparing the alignment of the prototype door with respect to the prototype body to a desired alignment of the prototype door with respect to the prototype body to arrive at a difference between the alignment of the prototype door with respect to the prototype body and the desired alignment of the prototype door with respect to the prototype body. The difference between the alignment of the prototype door with respect to the prototype body and the desired alignment of the prototype door with respect to the prototype body is an adjustment to the target position. The desired position is the target position combined with the adjustment to the target position.

DETAILED DESCRIPTION

The present subject matter provides a method and system for making a vehicle, which ensure a proper alignment of a sliding side door on a body of a vehicle, so that when the sliding side door is connected to the vehicle and is in a closed configuration, the door is in a desired alignment with respect to the body of the vehicle.

When in the desired alignment, the sliding side door functions and aesthetically appears as designed.

The method is based on attaching an anchor plate for a roller assembly at a desired position on a sliding side door, which desired position is ascertained before the door is attached to the vehicle rather than after the door is attached to the vehicle, and can be used to put a sliding side door in a desired alignment with the vehicle body, which is an alignment in which the sliding side door is to be attached to the vehicle so that the sliding side door is properly aligned on the vehicle.

The desired alignment of the door is attained by attaching an anchor plate in the desired position on the door. A roller assembly is then attached to the anchor plate and to a rail on the vehicle. The method is used to ascertain the desired position of the anchor plate on the door, which can then be used as a standard by which one or a plurality of doors are attached in a desired alignment to one or to respective ones of a plurality of vehicles. The method of ascertaining the desired position is not required to be individually performed for each one of the plurality of vehicles, but may be performed once and then the ascertained desired position of the anchor plate is used for the production of one or each of a plurality of subsequently-produced vehicles. A jig is used to secure the anchor plate when it is welded to the door during production of each one of the plurality of vehicles, thus ensuring that the anchor plate is attached at the desired position on the door or within an acceptable variation from the desired position, which in turn ensures that the sliding side door will be attached to the vehicle in a desired alignment with the vehicle body.

Referring to the FIGS. 1-9, the method (FIG. 9) includes initially making a first vehicle 22 as a prototype at 70. The prototype vehicle 22 may have a similar or identical design as a production vehicle 2, or pertinent portions thereof, which is to be made subsequently to the prototype vehicle 22 using the to-be-determined desired alignment for an anchor plate.

The prototype vehicle 22 may be made by slidably attaching a prototype sliding side door 24 to a prototype vehicle body 26 via a prototype anchor plate 28 attached to the prototype door 24 and a prototype roller assembly 30 (schematically depicted) that is attached to the prototype anchor plate 28 and to a prototype rail 32 on the prototype vehicle body 26. The prototype door 24 may have three, or more or less, prototype roller assemblies 30 attaching it to the prototype vehicle body 26 as schematically depicted in the figures, e.g. an upper prototype roller assembly 30 at the top of the prototype door 24, a center prototype roller assembly 30 at a middle of the prototype door 24, and a lower prototype roller assembly 30 at a bottom of the prototype door 24.

All of these relevant components of the prototype vehicle 22 may have a similar or identical design as the corresponding components of the vehicle 2 to be subsequently produced, which vehicle 2 includes a sliding side door 4 slidably connected to a body 6 of the vehicle 2 in a desired alignment with respect to the vehicle body 6. The door 4 is to be slidably connected to the vehicle body via an anchor plate 8, a roller assembly 10 (schematically depicted), and a rail 12. The anchor plate 8 is connected to an inside 18 of the door 4 and the roller assembly 10 is connected to and inside 20 of the anchor plate 8. The door 4 is slidably connected to the vehicle body 6 by connecting the roller assembly 10 to the rail 12 on the vehicle body 6.

Figure 1:
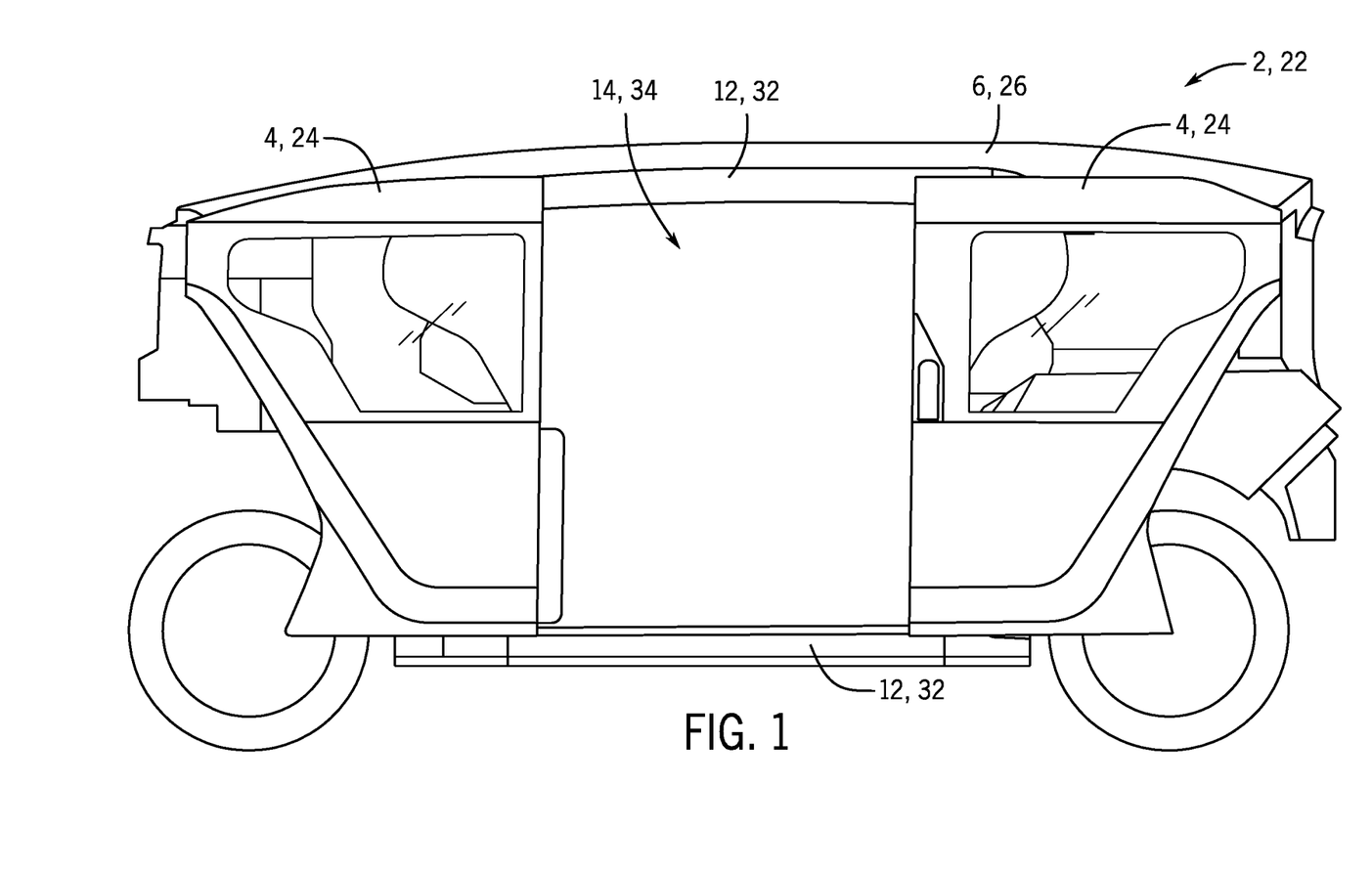
FIG. 1 is a side view of a vehicle and prototype vehicle produced by a method according to the present subject matter.
Figure 2:
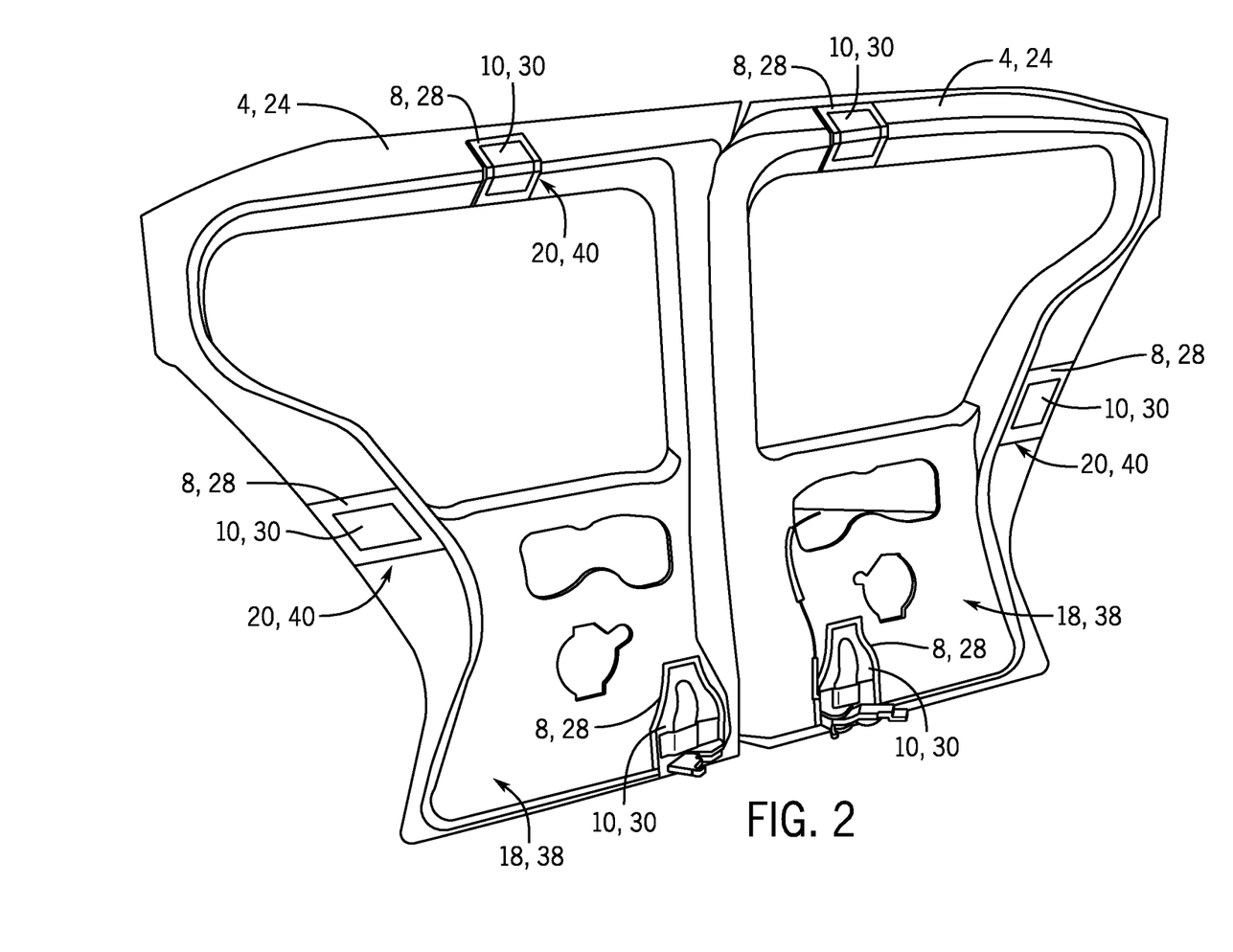
FIG. 2 is a perspective view of double sliding side doors of the vehicle and the prototype vehicle of FIG. 1.

The door 4 may include one or more of the anchor plates 8 and a corresponding number of the roller assemblies 10. FIG. 2 shows three roller assemblies 10 and three corresponding anchor plates 8 attached to each of two doors 4. The vehicle 2 may include one or more doors 4 connected thereto for covering one or more openings 14. FIGS. 1 and 2 shows two doors 4 for covering one opening 14, which slide toward each other to close off the opening 14 in a closed configuration (FIG. 2), and away from each other to uncover the opening 14 in an open configuration (FIG. 1).

Figure 3:
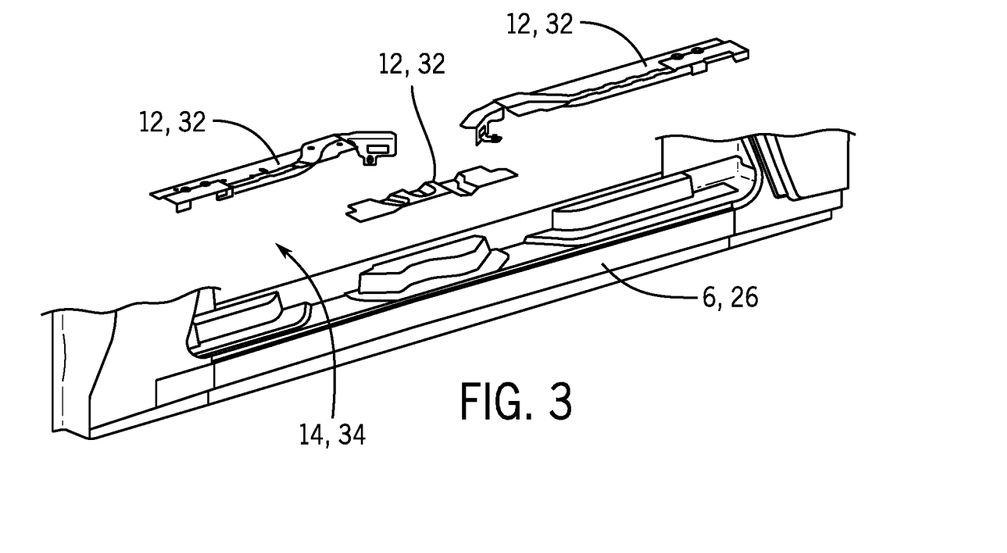
FIG. 3 is a perspective exploded partial view the lower rail of the vehicle and the prototype vehicle of FIG. 1.

The prototype vehicle 22 may be produced by connecting the prototype anchor plate 28 at a target position to an inside 40 of the prototype door 24. The target position may be a position on the inside 40 of the prototype door 24 that is determined to correspond to a position of the prototype rail 32 (which may be of several pieces as depicted in FIG. 3) on the prototype vehicle body 26 so as to allow the prototype door 24 to align with the prototype vehicle body 26 and thus to the prototype opening 34 when the prototype door 24 is in a closed configuration. The prototype roller assembly 30 is then connected via mechanical fasteners to the prototype anchor plate 28, which may provide a consistent alignment between the prototype roller assembly 30 and the prototype anchor plate 28. The prototype rail 32 is connected to the prototype body 26 of the prototype vehicle 22. The prototype roller assembly 30, already connected to the prototype door 24, is then slidably connected to the prototype rail 32 on the prototype body 26 of the prototype vehicle 22, thus connecting the prototype door 24 to the prototype vehicle body 26.

Once the prototype vehicle 22 is made, the method includes at 72 ascertaining an alignment of the prototype door 24 with respect to the prototype body 26 when the prototype door 24 is in a closed configuration.

The alignment of the prototype door 24 with respect to a prototype body 26 may be ascertained by measuring various metrics of the prototype door 24 with respect to the prototype body 26. These metrics may include a gap between the prototype door 24 and the prototype vehicle body 26, measuring how flush a surface of the prototype door 24 is with a surface of the prototype vehicle body 26 (i.e. a flushness or evenness of the surfaces), measuring how much a prototype weather stripping is compressed between the prototype door 24 and the prototype vehicle body 26, etc., or combinations thereof.

The metrics may be measurements between the prototype door 24 and the prototype vehicle body 26, which measurements may be taken in any direction with respect to the prototype vehicle 22, including in an up and down direction, in a forward and backward direction, in an inboard and outboard direction, or in a direction between these. Measurements made to determine the alignment of the prototype door 24 with respect to the prototype body 26 may be taken based on datums established on the prototype door 4 and the prototype body 26.

Due to imperfections (e.g. tolerances) in manufacturing the various components of the prototype vehicle 22, due to imperfections in attaching these components together to form the prototype vehicle 22, which processes may be automated, and due to sagging of parts (e.g. the prototype roller assembly 30) under the weight of the prototype door 24, the target position for the prototype anchor plate 28 on the prototype door 24 may not provide a proper alignment of the prototype door 24 to the prototype vehicle body 26, the proper alignment of the prototype door 24 being the same as the desired alignment of the door 4 to the vehicle body 6. If the prototype door 24 is not in the proper alignment, i.e. is misaligned, with respect to the prototype vehicle body 26, then the prototype door 24 may be considered to be out of alignment or misaligned.

Once the alignment of the prototype door 24 with respect to the prototype body 26 is ascertained, the method includes at 74 determining the amount of misalignment by comparing a) this alignment of the prototype door 24 with respect to the prototype body 26 of the prototype vehicle 22 to b) the proper alignment/desired alignment of the prototype door 24 (which may be the same as the desired alignment of the door 4 with respect to the body 6 of the vehicle 2). This difference between the alignment and the desired alignment of the prototype door 4 is the amount of misalignment of the prototype door 4.

The method includes at 76 determining a desired position of the anchor plate 8 with respect to the door 4. The desired position is a position of the anchor plate 8 on the door 4 that will allow the door 4 to be in the desired alignment with respect to the body 6 of the vehicle 2 when the door 4 is slidably connected to the body 6 of the vehicle 2 and is in a closed configuration. A difference between the alignment of the prototype door 24 and the desired alignment of the prototype door 24 (i.e. the amount of misalignment) is then used to determine how much to adjust an attachment position of the anchor plate 8 to the door 4. The attachment position at which the anchor plate 8 will be attached to the door 4 (i.e. the desired position) is determined by adjusting the target position of the anchor plate 8 by the amount of misalignment of the door 4.

Movement of the anchor plate 8 from being attached to the door 4 at the target position, to being attached at the desired position, will result in a corresponding movement of the door 4 from being misaligned to being in the desired alignment with the vehicle body 6 and thus also with the opening 14. If the prototype door 24 is misaligned in one direction by a distance with respect to the prototype vehicle body 6, e.g. out of alignment by 1.5 mm in a direction up from the prototype vehicle body 26, then during production of the vehicle 2, the anchor plate 8 may be attached to the door 4 at a position (i.e. the desired position) that is separated from the target position by the same distance and in the same direction e.g. attached at the desired position that is 1.5 mm up from the target position. This modification of the attachment position at which the anchor plate 8 is attached to the door 4 from the target position to the desired position will result in the door 4 being in the desired alignment with the vehicle body 6, e.g. by the door 4 being moved down 1.5 mm from a misalignment that would otherwise occur if the anchor plate 8 were attached to the target position.

The desired position of the anchor plate 8 with respect to the door 4 may be adjusted from the target position by the difference between the alignment of the prototype door 24 and the proper alignment of the prototype door 24 (i.e. by the amount of misalignment of the prototype door 24), or within an acceptable variation from the difference. An upper anchor plate 8 (FIG. 6) may be adjusted in a forward and backward direction with respect to the target position as indicated by the double sided arrow in FIG. 6. A center anchor plate 8 (FIG. 7) may be adjusted in a forward and backward direction and in a up and down direction with respect to the target position as indicated by the double sided arrow in FIG. 7. A lower anchor plate 8 (FIG. 8) may be adjusted in a forward and backward direction and in a up and down direction with respect to the target position as indicated by the double sided arrow in FIG. 8. The anchor plates 8 may be adjusted in other directions with respect to the target location.

Once the desired position is determined for the anchor plate 8, the method includes producing the vehicle 2, or a plurality of vehicles 2, by connecting the sliding side door 4 on the body 6 of the vehicle 2. This may include at 78 providing the roller assembly 10, an anchor plate 8 for the roller assembly 10, and a jig 16 (three of which are shown schematically on the right side in FIG. 5). The method includes at 82 using the jig 16 to secure the door 4 and the anchor plate 8 in a fixed position relative to each other. This may include securing the anchor plate 8 at the inside 18 of the door 4 and contacting the door 4.

A position of the anchor plate with respect to the door is adjusted. The position of the anchor plate 8 with respect to the door 4 may be adjusted so that the anchor plate 8 is in the desired position with respect to the door 4, which desired position is different than the target position. This may be done while the jig 16 is securing the door 4 and anchor plate 8, or not. When the anchor plate 8 is attached in the desired position to the door 4, the door 4 will be in the desired alignment with respect to the body 6 of the vehicle 2 when the door 4 is attached to the body 6 of the vehicle 2 and is in the closed configuration.

While the jig 16 is securing the anchor plate 8 and the door 4 and after adjusting the position of the anchor plate 8 with respect to the door 4 so that the anchor plate 8 is in the desired position, the method includes at 84 connecting the anchor plate 8 to the inside 18 of the door 4. The anchor plate 8 may be connected to the door 4 by one or more welds between the anchor plate 8 and the door 4. Thus, this process of attaching the anchor plate 8 to the door 4 at the desired position, which ensures the door 4 will be in the desired alignment with respect to the body 6 of the vehicle 2, can be performed by a welding group and/or in a welding step during production of the vehicle 2 when other structural welds are being made on the vehicle 2. Being performed by the welding group and/or in the welding step, allows for some level of automation of this step and thus provides a more consistent attachment of the anchor plate 8 at the desired position on the door 4 with less variation, less time consumed, and less human work, as compared to adjusting the alignment of the door later in the production process, than if performed after the welding and after the door 4 has already been attached to the vehicle body 6, which may require a manual adjustment of the alignment of the door 4 with respect to the vehicle body 6, and which alignment may be slightly different from one vehicle 2 to another, thus requiring a unique adjustment of the door 4 for each individual vehicle 2 being produced.

The jig 16 is not particularly limited, and may include various structures that are able to secure the door 4 and the anchor plate 8 in relation to each other. In FIG. three jigs 16 are schematically shown securing one anchor plate 8 each. One jig 16 could secure all three anchor plates 8, or more or less anchor plates 8. Two or more jigs 16 could hold one anchor plate 8.

When holding the door 4 and anchor plate 8, the jig 16 may allow relative movement of the door 4 and anchor plate 8 so that the anchor plate 8 is in the desired position relative to the door 4. The jig 16 may then hold the anchor plate 8 at the desired position, thus allowing the anchor plate 8 to be welded to the door 4 at the desired position on the door 4. As used herein, the desired position is the position at which the anchor plate 8 is attached to the door 4 that allows for the desired alignment of the door 4 with respect to the vehicle body 6, and includes an acceptable variation from the desired position on the door 4. The acceptable variation may be greater than 0 mm and less than 5 mm from the desired position, i.e. ±5 mm, or ±4 mm, ±3 mm, ±2 mm, ±1.5 mm, ±1 mm, or less.

The method includes at 88 connecting the roller assembly 10 to the anchor plate 8. This connection may be accomplished using fasteners, e.g. screws or bolts, which may provide a consistent orientation between the roller assembly 10 and the anchor plate 8 on each vehicle 2 produced, and thus not substantially effect the alignment of the door 4 to the vehicle body 6. The door 4 and the anchor plate 8 may be removed at 86 from the jig 16 prior to connecting the roller assembly 10 to the anchor plate 8.

The method includes at 92 connecting the door 4 to the body 6 of the vehicle 2 by connecting the roller assembly 10 to the rail 12 on the body 6 of the vehicle 2. Rollers (not shown) on the roller assembly 10 may mate with, and slide along, the rail 12, thus allowing the door 4 to be slidingly moved between the open configuration in which an opening 14 in the vehicle body 6 is not covered by the door 4, and the closed configuration in which the opening 14 is covered by the door 4.

Once determined, the desired position can be used to prepare one vehicle 2, or a plurality of vehicles 2.

The method of making the vehicle 2 includes using the jig 16 for securing the door 4 and the anchor plate 8 in relative positions with respect to each other. The jig 16 is used to arrange the anchor plate 8 in the desired position with respect to the door 4. The anchor plate 8 can then be welded to the door 4 while being held by the jig 16 in the desired position. The roller assembly 10 is attached to the anchor plate 8 and to the rail 12 on the vehicle body 6, thus connecting the door 4 to the vehicle body 6.

Figure 4:
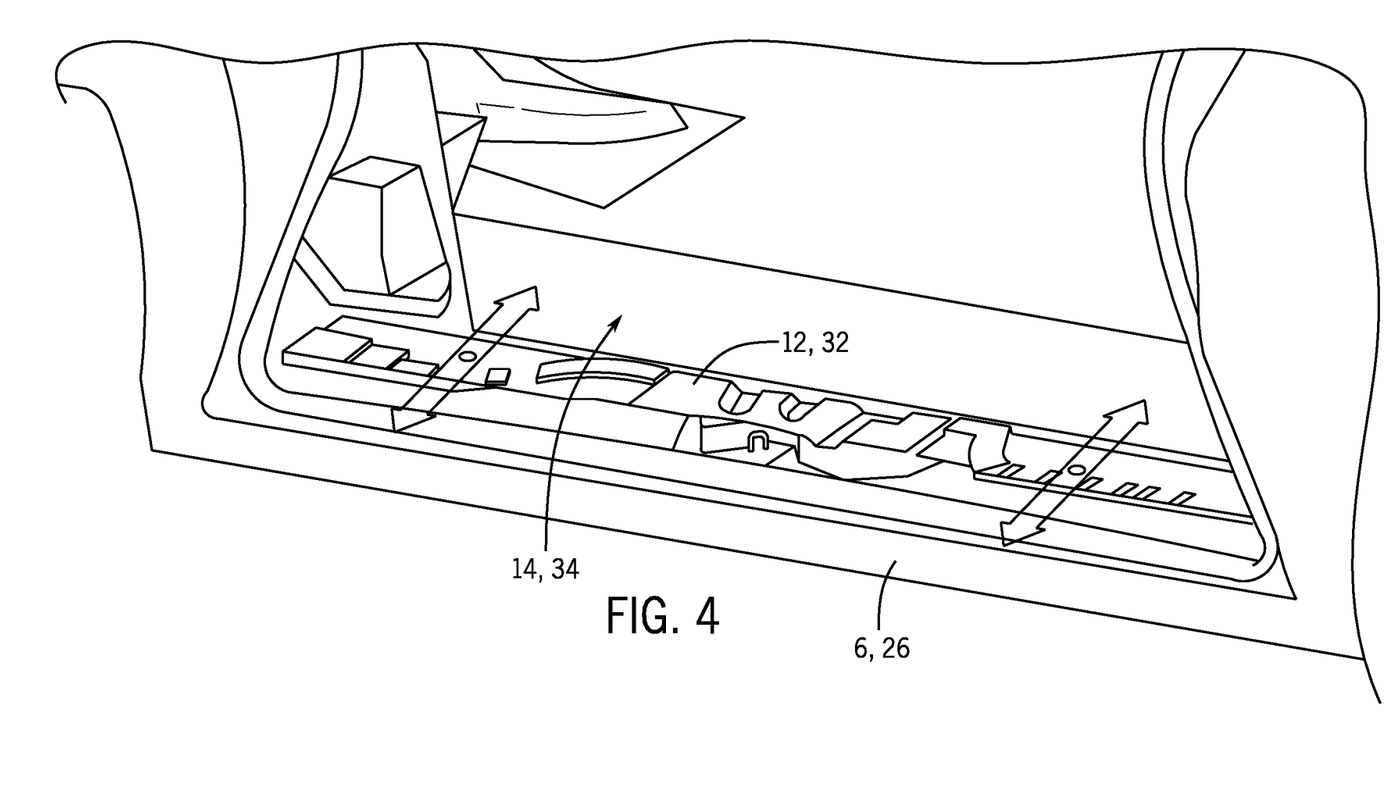
FIG. 4 is a perspective partial view of the lower rail of the vehicle and the prototype vehicle of FIG. 1.
Figure 5:
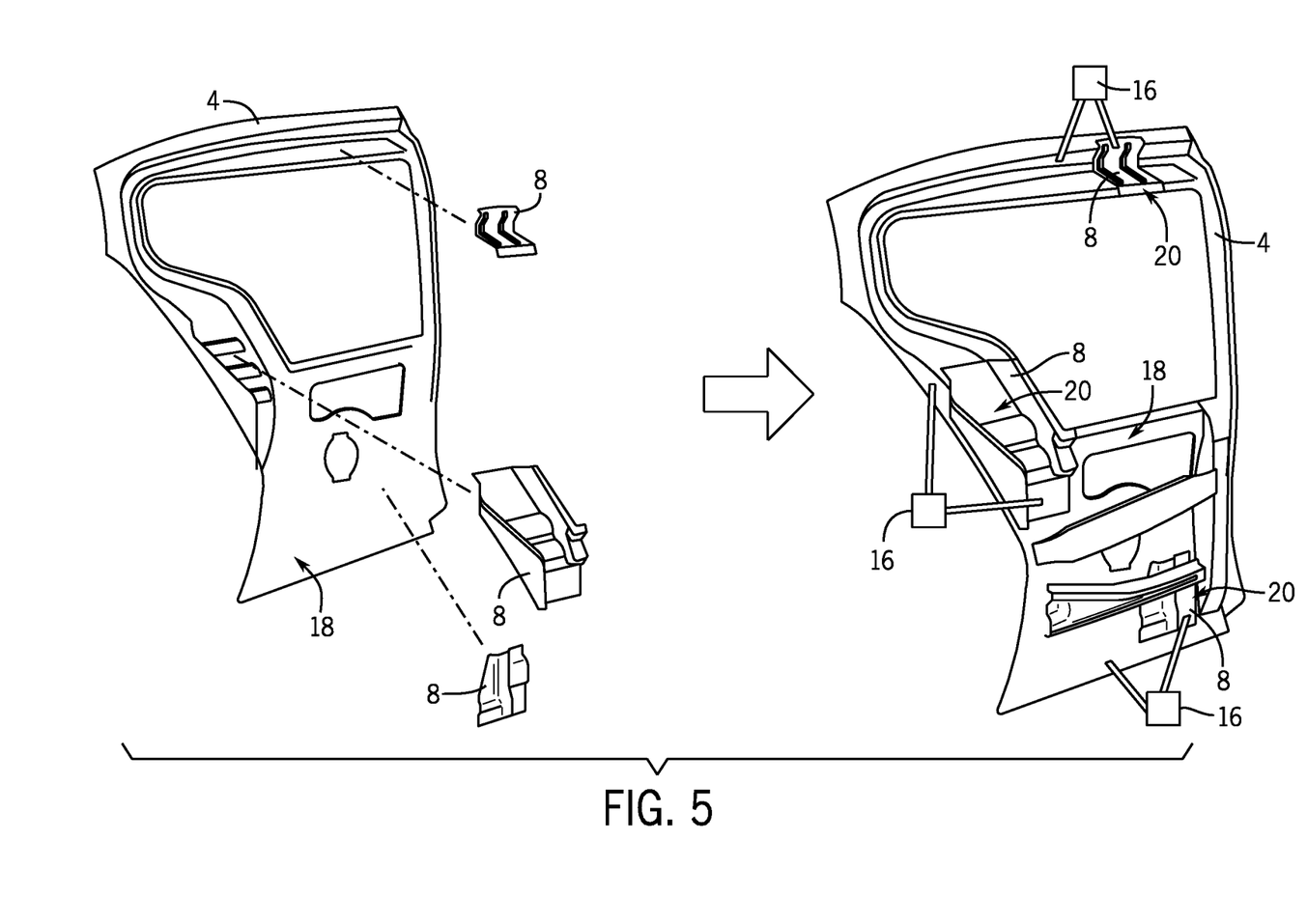
FIG. 5 is a schematic perspective view of a method of attaching anchor plates at a desired position to a sliding side door according to the present subject matter.

The method may also include at 90 adjusting a position of the rail 12 on the body 6 of the vehicle 2 so that when the door 4 is mounted to the body 6 of the vehicle 2 and is in the closed configuration, the door 4 is in the desired alignment with respect to the body 6 of the vehicle 2. The position of the rail 12 on the vehicle body 6 may be adjusted in any direction, including in an inboard and outboard direction as indicated by the double sided arrows in FIG. 4, which may cause the door 4 to move in or out with respect to the vehicle body 6. FIG. 4 shows a position of a bottom rail 12 being adjusted with respect to the vehicle body 6 so that when the door 4 is mounted to the body 6 of the vehicle 2 and is in the closed configuration, the door 4 is in the desired alignment with respect to the body 6 of the vehicle 2. A position of a top rail 12 (shown in FIG. 1) or of a center rail (not shown in FIG. 1 but arranged behind the doors 4) can also be adjusted with respect to the vehicle body 6 so that when the door 4 is mounted to the body 6 of the vehicle 2 and is in the closed configuration, the door 4 is in the desired alignment with respect to the body 6 of the vehicle 2.

When the door 4 is attached to the vehicle body 6 and in the closed configuration, the anchor plate 8 being in the desired position on the door 4 causes, and thus ensures, the door 4 to be in a desired alignment with respect to the vehicle body 6.

The desired alignment of the door 4 with respect to the vehicle body 6 may be selected by a user based on metrics relating to aesthetics, proper functioning of the door 4 (such as movement of the door 4 on the rail 12 between, or latching of the door 4 in, the open configuration and/or the closed configuration), an amount of compression of weather stripping between the door 4 and the vehicle body 6 (which may inhibit leaks between the door 4 and a weather stripping material on the vehicle body 6 or between the vehicle body 6 and weather stripping on the door 4, or on other criteria). The desired alignment of the door 4 with respect to the vehicle body 6 may include the door 4 satisfying one or more metrics, within an acceptable amount of variance from the metric, with respect to the body 6. The desired alignment of the door 4 with respect to the vehicle body 6 may include a gap between the door 4 and the body 6 being under a certain size; an outer or inner surface of a door 4 being flush, or within a certain distance variation from flush, with an outer or inner surface of the vehicle body 6; a weather stripping arranged between the door 4 and the vehicle body 6 being compressed by a certain amount or distance; an ability of a door catch of the door 4 to mate with a door latch on the vehicle body 6; a height of the door with respect to a height of the vehicle body 6; a forward or backward alignment with the vehicle body 6, an inboard or outboard alignment with the vehicle body 6, an up and down alignment with the vehicle body 6; etc.; or combinations thereof.

Figure 6:
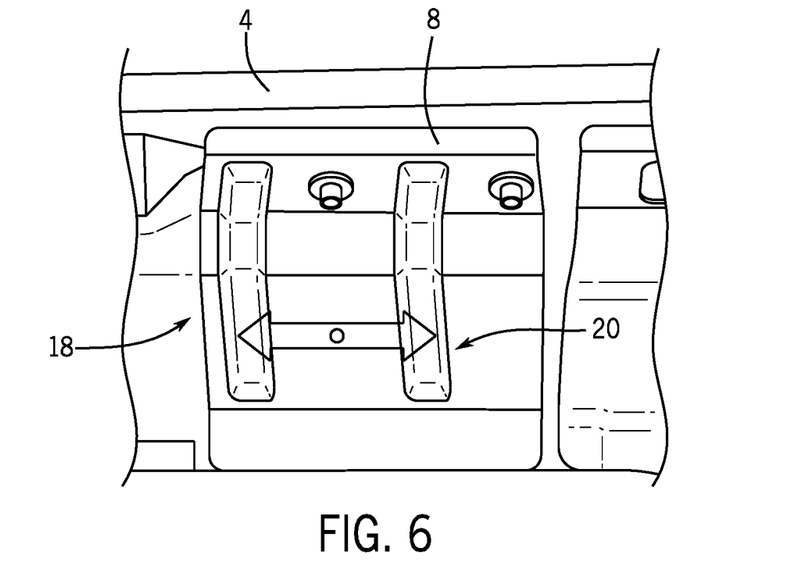
FIG. 6 is a side view of an upper anchor plate attached at a desired upper position on a sliding side door according to the present subject matter.
Figure 7:
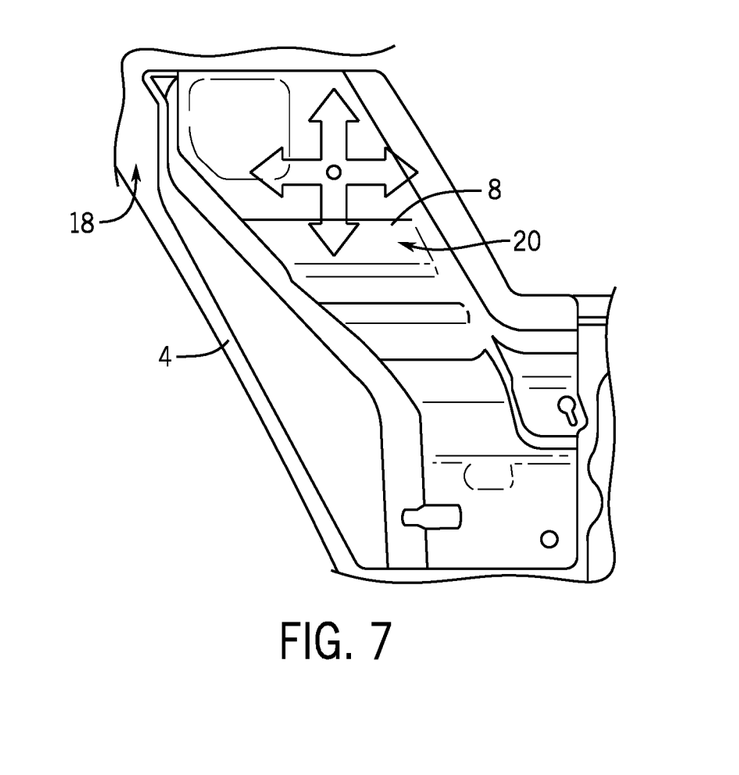
FIG. 7 is a side view of an center anchor plate attached at a desired center position on a sliding side door according to the present subject matter.
Figure 8:
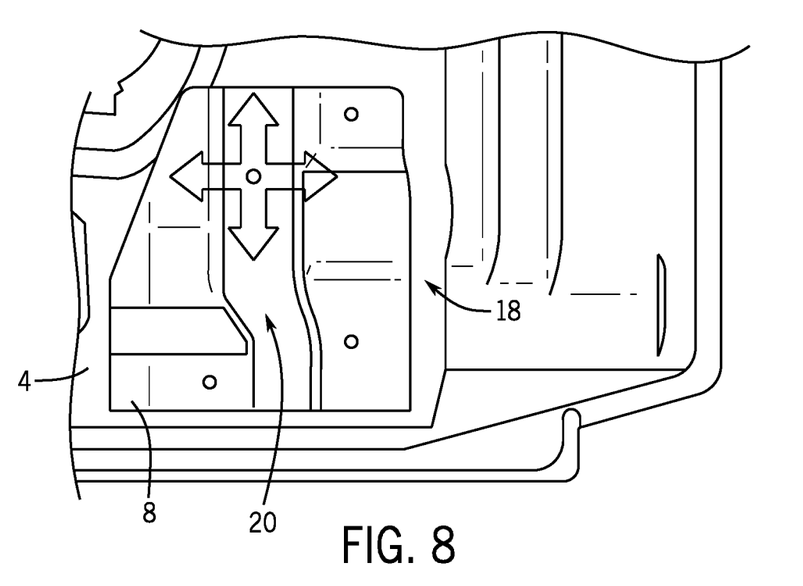
FIG. 8 is a side view of a lower anchor plate attached at a desired lower position on a sliding side door according to the present subject matter.
Figure 9:
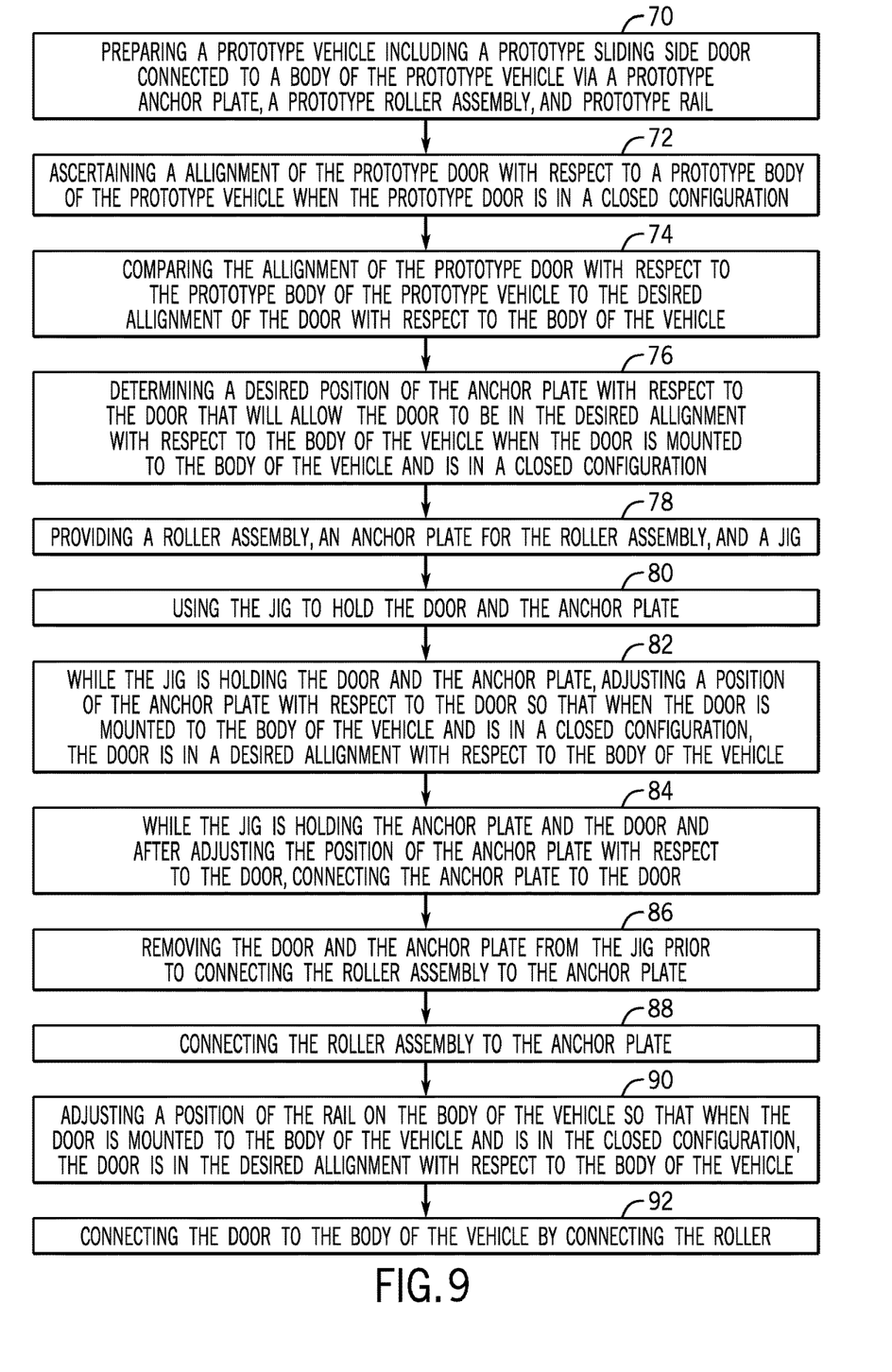
FIG. 9 is a method of making a vehicle according to the present subject matter.

The method can be performed for each of the roller assemblies 10 in FIGS. 6-8. Steps 70-76 of method of FIG. 9 may be performed once, and then used to connect multiple doors 4 to respective ones of a plurality of vehicles 2, while steps 78-92 may be performed for each of the plurality of vehicles 2.

A method of producing a plurality of vehicles 2 includes I) determining a desire position for the anchor plate 8, including by a) preparing the prototype vehicle 22 including the prototype anchor plate 28 attached at the target position to the prototype door 24; b) ascertaining the alignment of the prototype door 24 with respect to the prototype body 26 when the prototype door 24 is in the closed configuration; and c) comparing the alignment of the prototype door 24 with respect to the prototype body 26 to the desired alignment of the prototype door 24 with respect to the prototype body 26 to arrive at a difference between these alignments.

The difference between these alignments is used as an adjustment to the target position. The desired position is the target position combined with the adjustment to the target position. The method includes II) producing the plurality of vehicles including by e) providing the roller assembly 10, the anchor plate 8, and the jig 16; f) using the jig 16 to secure the sliding side door 4 and the anchor plate 8; g) adjusting a position of the anchor plate 8 with respect to the door 4 so that the anchor plate 8 is in the desired position; h) connecting the anchor plate 8 to the door 4 in the desired position; i) connecting the roller assembly 10 to the anchor plate 8; and j) connecting the door 4 to the body 6 by connecting the roller assembly 10 to the rail 12.

A system for connecting the sliding side door 4 to the body 6 includes the upper anchor plate 8 (FIG. 6) configured to attach to the sliding side door 4 at a desired upper position on the sliding side door 4 (as shown in FIG. 6); an upper roller assembly 10 configured to attach to the sliding side door 4 via the upper anchor plate 8 (FIG. 6); the center anchor plate 8 (FIG. 7) configured to attach to the sliding side door 4 at a desired center position on the sliding side door 4 (as shown in FIG. 7); a center roller assembly 10 configured to attach to the sliding side door 4 via the center anchor plate 8 (FIG. 7); the lower anchor plate 8 (FIG. 8) configured to attach to the sliding side door 4 at a desired lower position on the sliding side door (as shown in FIG. 8); and the lower roller assembly 10 configured to attach to the sliding side door 4 via the lower anchor plate 8 (FIG. 8). In using the system, attaching the upper anchor plate 8 to the sliding side door 4 at the desired upper position (FIG. 6), attaching the center anchor plate 8 to the sliding side door 4 at the desired center position, and attaching the lower anchor plate 8 to the sliding side door 4 at the lower upper position will result in the sliding side door 4 being properly aligned with the body 6 of the vehicle 2.

A method of determining the desired position for the anchor plate 8 on the sliding side door 4 includes a) preparing the prototype vehicle 22 at 70; b) ascertaining an alignment of the prototype door 24 with respect to the prototype body 6 when the prototype door 24 is in a closed configuration at 72; and c) comparing the alignment of the prototype door 24 with respect to the prototype body 26 to a desired alignment of the prototype door 24 with respect to the prototype body 26 at 74 to arrive at a difference between the alignment of the prototype door 24 with respect to the prototype body 26 and the desired alignment of the prototype door 24 with respect to the prototype body 26. The difference between the alignment of the prototype door 24 with respect to the prototype body 26 and the desired alignment of the prototype door 24 with respect to the prototype body 26 is an adjustment to the target position. The desired position is the target position combined with the adjustment to the target position.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of connecting a sliding side door on a body of a vehicle, the method comprising:
   a) providing a roller assembly, an anchor plate for the roller assembly, and a jig;
   b) using the jig to secure the door and the anchor plate relative to each other;
   c) adjusting a position of the anchor plate with respect to the door so that, when the door is mounted to the body of the vehicle and is in a closed configuration, the door is in a desired alignment with respect to the body of the vehicle;
   d) while the jig is securing the anchor plate and the door and after adjusting the position of the anchor plate with respect to the door, connecting the anchor plate to the door;
   e) connecting the roller assembly to the anchor plate; and
   f) connecting the door to the body of the vehicle by connecting the roller assembly to a rail on the body of the vehicle.

2. The method of claim 1, further comprising the following steps performed before steps a) to f):
   g) preparing a prototype vehicle including a prototype sliding side door connected to a prototype body of the prototype vehicle via a prototype anchor plate, a prototype roller assembly, and prototype rail;
   h) ascertaining an alignment of the prototype door with respect to the prototype body of the prototype vehicle when the prototype door is in a closed configuration;
   i) comparing the alignment of the prototype door with respect to the prototype body of the prototype vehicle to the desired alignment of the door with respect to the body of the vehicle; and
   j) determining a desired position of the anchor plate with respect to the door that will allow the door to be in the desired alignment with respect to the body of the vehicle when the door is mounted to the body of the vehicle and is in the closed configuration,
   wherein the position of the anchor plate with respect to the door is adjusted in step c) so that the anchor plate is in the desired position with respect to the door.

3. The method of claim 2, wherein step h) includes measuring a distance between the prototype door and the prototype body.

4. The method of claim 3, wherein the jig secures the anchor plate with respect to the door in step d) to be within 3.0 mm or less of the desired position.

5. The method of claim 4, wherein the position of the anchor plate with respect to the door is adjusted in step c) by moving the anchor plate in an up and down direction, a forward and backward direction, or a combination thereof.

6. The method of claim 5, further comprising a step of adjusting a position of the rail on the body of the vehicle so that when the door is mounted to the body of the vehicle and is in the closed configuration, the door is in the desired alignment with respect to the body of the vehicle.

7. The method of claim 6, wherein the position of the rail on the body of the vehicle is adjusted by moving the rail in an inboard and outboard direction.

8. The method of claim 1, wherein connecting the anchor plate to the door includes welding the anchor plate to the door.

9. The method of claim 1, further comprising removing the door and the anchor plate from the jig prior to connecting the roller assembly to the anchor plate.

10. The method of claim 1, wherein the roller assembly is a lower roller assembly, a center roller assembly, or an upper roller assembly for the door.

11. A method of producing a plurality of vehicles, comprising:
   I) determining a desired position for an anchor plate including:

a) preparing a prototype vehicle including a prototype body, a prototype sliding side door connected to the prototype body via a prototype anchor plate attached at a target position to the prototype door, a prototype rail attached to the prototype body, and a prototype roller assembly connected to the prototype anchor plate and the prototype rail;

b) ascertaining an alignment of the prototype door with respect to the prototype body when the prototype door is in a closed configuration; and c) comparing the alignment of the prototype door with respect to the prototype body to a desired alignment of the prototype door with respect to the prototype body to arrive at a difference between the alignment of the prototype door with respect to the prototype body and the desired alignment of the prototype door with respect to the prototype body;

wherein the difference between the alignment of the prototype door with respect to the prototype body and the desired alignment of the prototype door with respect to the prototype body is an adjustment to the target position, and wherein the desired position is the target position combined with the adjustment to the target position, and II) producing the plurality of vehicles including:

d) providing a roller assembly, an anchor plate for the roller assembly, and a jig;

e) using the jig to secure a sliding side door and the anchor plate relative to each other;

f) adjusting a position of the anchor plate with respect to the door so that the anchor plate is in the desired position such that when the door is mounted to a body of a vehicle of the plurality of vehicles and is in a closed configuration, the door is in a desired alignment with respect to the body of the vehicle;

g) while the jig is securing the anchor plate and the door and after adjusting the position of the anchor plate so the anchor plate is in the desired position, connecting the anchor plate to the door;

h) connecting the roller assembly to the anchor plate; and i) connecting the door to the body of the vehicle by connecting the roller assembly to a rail on the body of the vehicle.

12. The method of claim 11, wherein:
step I) is performed only once for a production of all of the plurality of vehicles; and
step II) is performed once for a production of each vehicle of the plurality of vehicles.

13. The method of claim 11, wherein the jig secures the anchor plate with respect to the door in step g) to be within 3.0 mm or less of the desired position.

14. The method of claim 11, wherein the position of the anchor plate with respect to the door is adjusted in step f) from the target position by moving the anchor plate in an up and down direction, a forward and backward direction, or a combination thereof by the adjustment to the target position.

15. The method of claim 11, further comprising a step of adjusting a position of the rail on the body of the vehicle so that when the door is mounted to the body of the vehicle and is in the closed configuration, the door is in the desired alignment with respect to the body of the vehicle.

* * * * *